US012568188B2

(12) United States Patent    (10) Patent No.:   US 12,568,188 B2

Agrawal et al.    (45) Date of Patent:   Mar. 3, 2026

(54) CONFERENCE CALLING WITH DYNAMIC SURFACING OF TRANSCRIPTS FOR OVERLAPPING AUDIO COMMUNICATION

(71) Applicant: MOTOROLA MOBILITY LLC, Wilmington, DE (US)

(72) Inventors: Amit Kumar Agrawal, Bangalore (IN); Himanshu Chug, Bangalore (IN)

(73) Assignee: Motorola Mobility LLC

( * ) Notice: Subject to any disclaimer, the term of this patent is extended or adjusted under 35 U.S.C. 154(b) by 219 days.

(21) Appl. No.: 18/479,020

(22) Filed: Sep. 30, 2023

(65) Prior Publication Data

US 2025/0113011 A1    Apr. 3, 2025

(51) Int. Cl.
   *H04N 7/15*      (2006.01)
   *H04N 7/14*      (2006.01)

(52) U.S. Cl.
   CPC ............. *H04N 7/152* (2013.01); *H04N 7/147* (2013.01); *H04N 7/155* (2013.01)

(58) Field of Classification Search
   CPC ....... G10L 15/00; G10L 15/063; G10L 17/18; G10L 25/84; G11B 27/031; H04L 12/1822; H04L 12/1831; H04L 65/1069; H04L 65/1083; H04L 65/4015; H04N 7/142; H04N 7/147; H04N 7/152; H04N 7/155; H04N 21/4788; G06F 3/167; G06K 19/06112; H04M 3/42187; H04M 3/56; H04M 3/563; H04M 3/566; H04M 3/568

See application file for complete search history.

(56) References Cited

U.S. PATENT DOCUMENTS

| | | | | |
|---|---|---|---|---|
| 12,073,849 B2 * | 8/2024 | Pichaimurthy | ......... | G10L 25/84 |
| 2003/0125954 A1 * | 7/2003 | Bradley | ................. | H04N 7/152 |
| | | | | 348/E7.084 |
| 2008/0094467 A1 * | 4/2008 | An | ......................... | H04N 7/142 |
| | | | | 348/14.02 |
| 2008/0117965 A1 * | 5/2008 | Vysotsky | ............ | H04L 65/1083 |
| | | | | 375/E7.076 |
| 2009/0028316 A1 * | 1/2009 | Jaiswal | ................. | H04M 3/566 |
| | | | | 379/202.01 |
| 2009/0060157 A1 * | 3/2009 | Kim | ................. | H04M 3/42187 |
| | | | | 379/202.01 |
| 2010/0080374 A1 * | 4/2010 | Hepworth | ............. | H04M 3/563 |
| | | | | 379/202.01 |
| 2010/0097438 A1 * | 4/2010 | Ujii | .................... | H04N 21/4788 |
| | | | | 348/14.01 |
| 2010/0124321 A1 * | 5/2010 | Alexandrov | ............ | H04M 3/56 |
| | | | | 379/202.01 |

(Continued)

*Primary Examiner* — Gerald Gauthier

(74) *Attorney, Agent, or Firm* — Isidore PLLC

(57)      ABSTRACT

A method provides techniques for detecting, by a processor of an electronic device, a connection to a conference call comprising multiple of call participants. The method includes rendering a conference call dashboard on a display of the electronic device. The conference call dashboard includes a participant region for each participant of the plurality of call participants. The method further includes detecting overlapping audio originating from at least two call participants. The method further includes, in response to detecting the overlapping audio, presenting, on the display, a text transcription of a respective audio of each of the at least two participants identified.

20 Claims, 10 Drawing Sheets

(56)                    References Cited

U.S. PATENT DOCUMENTS

| | | | | |
|---|---|---|---|---|
| 2010/0171807 A1* | 7/2010 | Tysso | H04N 7/147 | |
| | | | 348/14.09 | |
| 2010/0189241 A1* | 7/2010 | Miller | H04M 3/56 | |
| | | | 379/202.01 | |
| 2010/0189243 A1* | 7/2010 | Miller | H04M 3/56 | |
| | | | 379/202.01 | |
| 2012/0321062 A1* | 12/2012 | Fitzsimmons | H04L 65/4015 | |
| | | | 379/202.01 | |
| 2013/0022189 A1* | 1/2013 | Ganong, III | G10L 15/00 | |
| | | | 379/202.01 | |
| 2013/0216206 A1* | 8/2013 | Dubin | G11B 27/031 | |
| | | | 386/282 | |
| 2018/0176384 A1* | 6/2018 | Waugh | H04N 7/152 | |
| 2020/0110572 A1* | 4/2020 | Lenke | G06F 3/167 | |
| 2020/0218773 A1* | 7/2020 | Bejjanki | G06K 19/06112 | |
| 2020/0396416 A1* | 12/2020 | Jaynes | H04L 12/1822 | |
| 2021/0211317 A1* | 7/2021 | Khan | H04N 7/155 | |
| 2021/0400142 A1* | 12/2021 | Jorasch | H04L 65/1069 | |
| 2022/0103963 A1* | 3/2022 | Satongar | H04M 3/568 | |
| 2022/0131979 A1* | 4/2022 | Pham | G10L 17/18 | |
| 2023/0089308 A1* | 3/2023 | Wang | G10L 15/063 | |
| | | | 704/232 | |
| 2024/0073054 A1* | 2/2024 | Hong | H04L 12/1831 | |
| 2024/0146559 A1* | 5/2024 | Ramoutar | H04L 12/1822 | |
| 2024/0205037 A1* | 6/2024 | Callegari | H04L 12/1831 | |
| 2024/0414284 A1* | 12/2024 | Hanson | H04N 7/147 | |
| 2025/0113011 A1* | 4/2025 | Agrawal | H04N 7/152 | |

* cited by examiner

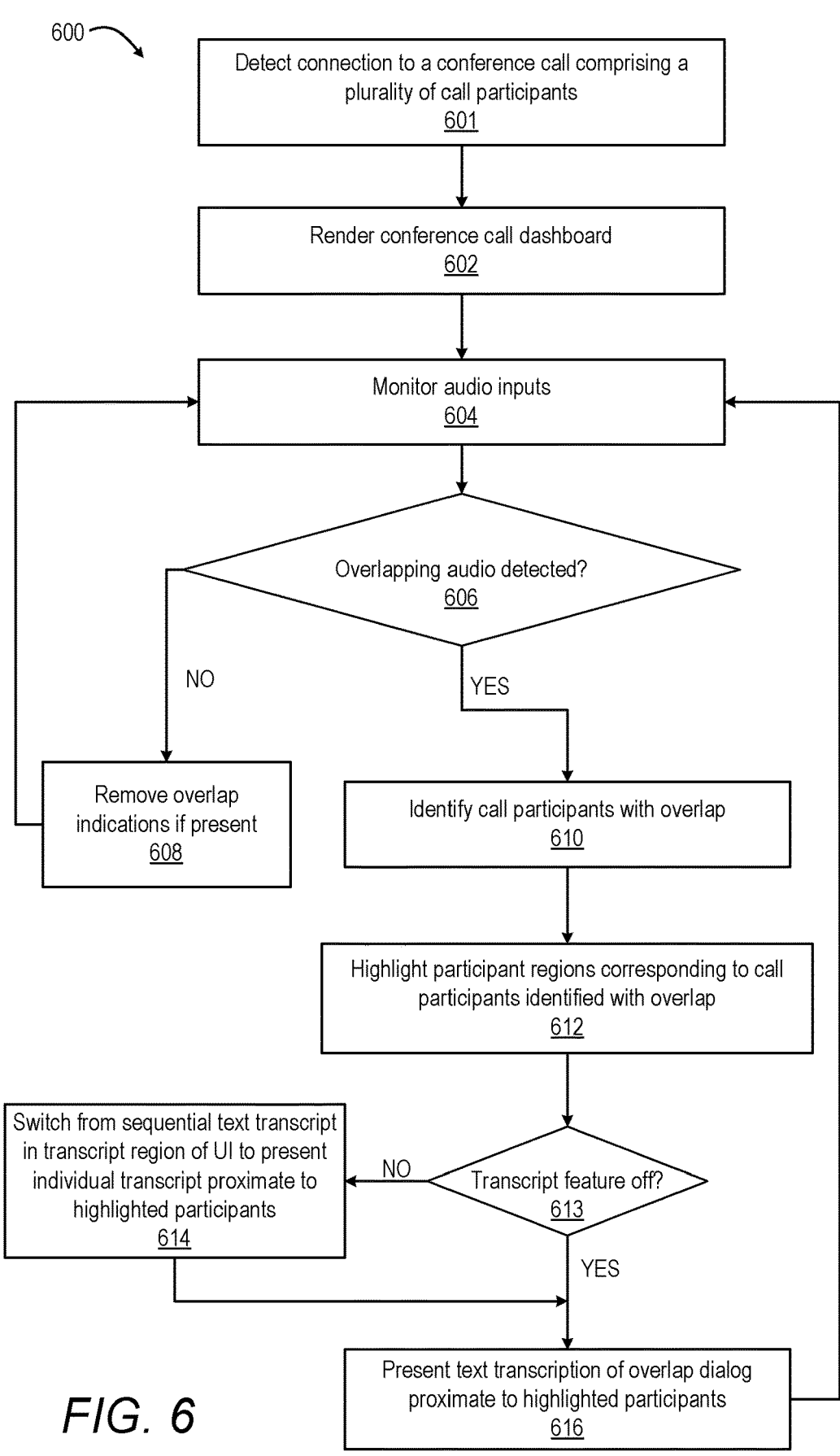

600

Detect connection to a conference call comprising a plurality of call participants
601

Render conference call dashboard
602

Monitor audio inputs
604

Overlapping audio detected?
606

NO

YES

Remove overlap indications if present
608

Identify call participants with overlap
610

Highlight participant regions corresponding to call participants identified with overlap
612

Switch from sequential text transcript in transcript region of UI to present individual transcript proximate to highlighted participants
614

NO

Transcript feature off?
613

YES

Present text transcription of overlap dialog proximate to highlighted participants
616

Determine arrival time of audio signals
702

Compute overlap duration
704

Duration exceeds threshold?
706

NO

YES

Indicate actionable overlap incident
708

Render conference call dashboard with visual highlight indication
710

CONFERENCE CALLING WITH DYNAMIC SURFACING OF TRANSCRIPTS FOR OVERLAPPING AUDIO COMMUNICATION

BACKGROUND

1. Technical Field

The present disclosure generally relates to electronic devices that support conference calls, and more specifically to electronic devices that support conference calls with multiple different participants.

2. Description of the Related Art

Conference calls are a popular form of communication, especially in the business world. Conference calls offer numerous benefits for businesses and can be particularly valuable for supporting collaboration with colleagues and communicating with others in remote locations. Conference calls eliminate the need for travel, reducing expenses associated with transportation, accommodation, and meal allowances for employees attending meetings in person. Participants can join meetings from their own locations, saving time that would otherwise be spent on commuting to a central meeting place. Furthermore, participants can join calls from anywhere with an internet connection, promoting flexibility in work arrangements and accommodating employees in various time zones. Moreover, conference calling can promote enhanced productivity and reduced downtime, as participants can quickly convene meetings, share information, and make decisions without the delays associated with physical gatherings. With conference calls, weather-related disruptions, traffic jams, and other factors that can impede in-person meetings are eliminated, reducing downtime and ensuring more consistent communication. In addition to business purposes, conference calls are also useful for social purposes, such as group family chats, virtual club meetings, and so on. Thus, conference calls have applications in a wide variety of scenarios.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6 depicts a flowchart of a method for detecting and indicating voice overlap in a conference call, according to one or more embodiments.

DETAILED DESCRIPTION

Figure 1:
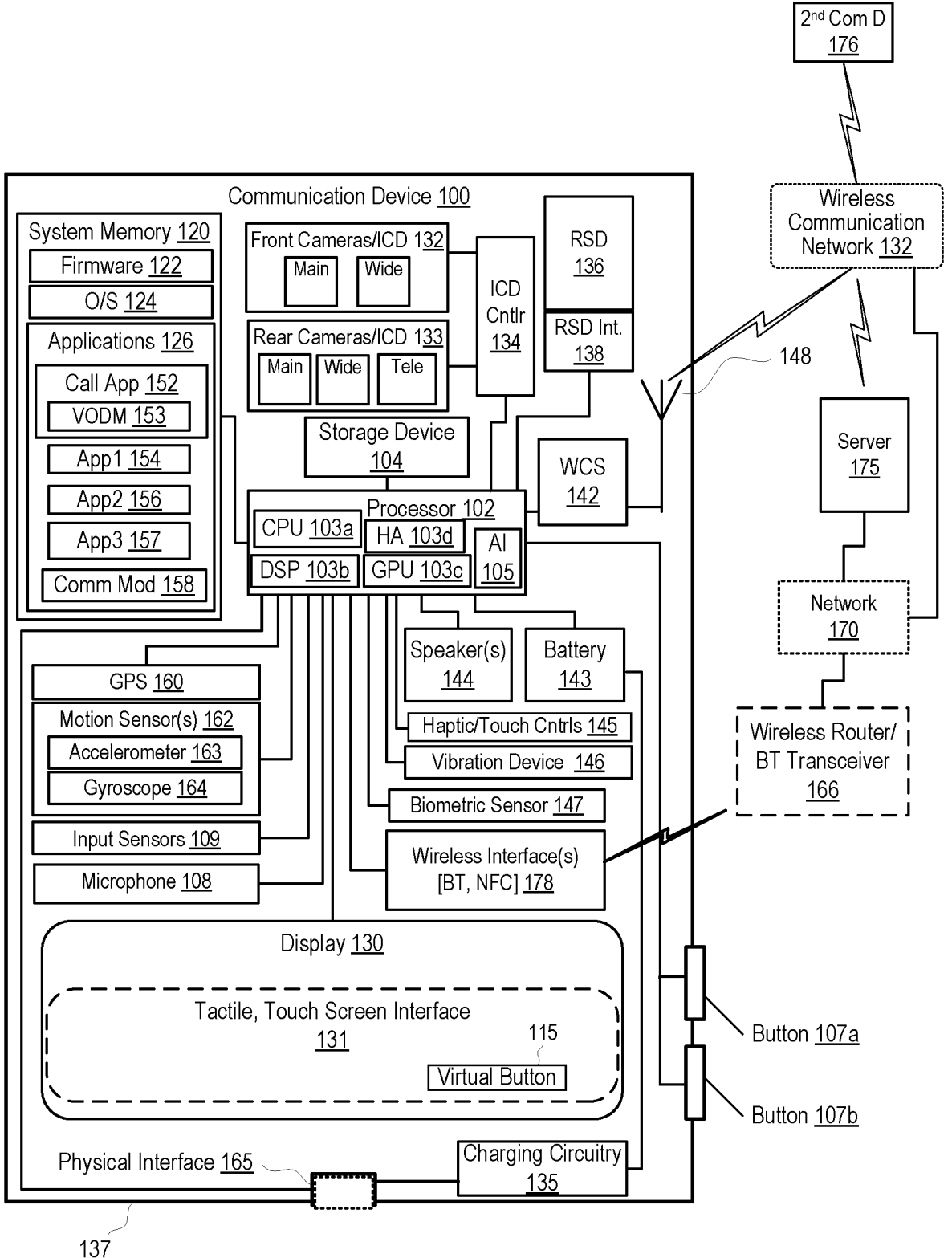
FIG. 1 depicts an example component makeup of a communication device with specific components used to enable the device to perform functions for surfacing of transcripts for overlapping audio communication during a conference call, according to one or more embodiments.

According to aspects of the present disclosure, an electronic device, a method, and a computer program product provides techniques for dynamic surfacing of transcripts for overlapping audio communication. A conference call dashboard displaying a plurality of call participants on a display of the electronic device. The conference call dashboard includes a participant region for each participant of the plurality of call participants. Overlapping audio originating from at least two call participants is detected. In response to detecting the overlapping audio, presenting, on the display, a text transcription of a respective audio of each of the at least two participants identified. In one or more embodiments, the text is rendered proximal to a visual highlight indication that corresponds to a call participant, enabling viewers of the conference call dashboard to conveniently identify speech spoken by call participants, even when multiple people are talking simultaneously on the conference call.

When multiple people are talking simultaneously on a conference call, the overlapping audio can lead to various problems and challenges that can hinder effective communication and collaboration. Cross-talk (overlap) occurs when multiple participants speak at the same time, resulting in a chaotic and unintelligible audio stream. This can make it difficult for the participants to understand what is being said. Additionally, temporally overlapping voices can cause audio clipping and distortion, making it challenging to decipher words and meaning. When multiple people talk at once, important information may be drowned out, and participants might miss crucial details or instructions. Furthermore, simultaneous conversations can lead to confusion, as participants may not know who is addressing whom or which discussion to follow, resulting in misunderstandings and miscommunication. Moreover, overlapping audio from multiple speakers can disrupt the flow of the conversation, making it challenging to maintain a structured discussion or agenda, and can also can lead to frustration among participants, diminishing the overall experience of the conference call.

The disclosed embodiments mitigate the aforementioned problems by detecting temporally overlapping audio from multiple participants in a conference call. In response to detecting an actionable audio overlap incident, the participants contributing to the overlapping audio are visually identified on a conference call dashboard. This visual identification enables all of the conference call participants to identify the specific participants that caused the overlap. The visual identification can be useful during a conference call since it can be difficult to understand what is being said when multiple call participants are speaking simultaneously. Additionally, one or more embodiments render transcripts of the overlapping dialog, enabling users to clearly see which participant said which dialog during the condition of overlapping audio. In one or more embodiments, the text transcript is rendered in proximity to a participant area of the conference call dashboard, enabling users to quickly identify who was talking and what was said. Moreover, disclosed embodiments can further provide an overlap warning to at least two call participants who are speaking simultaneously, thereby providing an alert that the overlap is occurring. Thus, disclosed embodiments can provide features to promote a culture of respectful and effective communication, thereby minimizing the problems associated with multiple people talking simultaneously on a conference call, and enabling a more productive virtual meeting environment.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of electronic device 100, within which various aspects of the disclosure can be implemented, according to one or more embodiments. Electronic device 100 includes specific components that enable the device to: detect connection to a conference call comprising a plurality of call participants; render a conference call dashboard on the display, the conference call dashboard including a participant region for each participant of the plurality of call participants; detect overlapping audio originating from at least two call participants; and in response to detecting the overlapping audio, present, on the display, a text transcription of a respective audio of each of the at least two participants identified with the overlapping audio. Examples of electronic device 100 include, but are not limited to, mobile devices, a notebook computer, a mobile phone, a smart phone, a digital camera with enhanced processing capabilities, a smart watch, a tablet computer, and other types of electronic device. It is appreciated that electronic device 100 can include other types of electronic devices that are capable of providing dynamic surfacing of transcripts for overlapping audio communication during a conference call.

Electronic device 100 includes processor 102 (typically as a part of a processor integrated circuit (IC) chip), which includes processor resources such as central processing unit (CPU) 103a, communication signal processing resources such as digital signal processor (DSP) 103b, graphics processing unit (GPU) 103c, and hardware acceleration (HA) unit 103d. In some embodiments, the hardware acceleration (HA) unit 103d may establish direct memory access (DMA) sessions to route network traffic to various elements within electronic device 100 without direct involvement from processor 102 and/or operating system 124. Processor 102 can interchangeably be referred to as controller 102.

Controller 102 can, in some embodiments, include image signal processors (ISPs) (not shown) and dedicated artificial intelligence (AI) engines 105. Controller 102 is communicatively coupled to storage device 104, system memory 120, input devices (introduced below), output devices, including integrated display 130, and image capture device (ICD) controller 134.

According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera. ICD controller 134 can perform these functions in response to commands received from processor 102 in order to control ICDs 132, 133 to capture video or still images of a local scene within a FOV of the operating/active ICD. Accordingly, in one or more embodiments, the electronic device includes a camera, the camera is communicatively coupled to the processor, and the conference call is a video conference call. Throughout the disclosure, the term image capturing device (ICD) is utilized interchangeably to be synonymous with and/or refer to any one of front or rear facing cameras 132, 133. Both sets of cameras 132, 133 include image sensors that can capture images that are within the field of view (FOV) of the respective ICD 132, 133.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102. Collectively, components integrated within processor 102 support computing, classifying, processing, transmitting and receiving of data and information, and presenting of graphical images within a display.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, conference call application 152, other applications, indicated as 154, 156, and 157, and communication module 158. Each module and/or application provides program instructions/code that are processed by processor 102 to cause processor 102 and/or other components of electronic device 100 to perform specific operations, as described herein. Descriptive names assigned to these modules add no functionality and are provided solely to identify the underlying features performed by processing the different modules. For example, conference call application 152 includes program instructions for facilitating connection to and participation in a conference call and a voice overlap detection module 153 that support electronic device 100 being configured to detect overlapping audio from multiple call participants, indicate the participants causing the overlapping audio, and/or generate a transcript of each individual audio track contributing to the overlapping audio. Additionally, in one or more embodiments, program code of voice overlap detection module 153 enables dynamic surfacing of transcripts for overlapping audio communication by the electronic device. Moreover, conference call application 152, through voice overlap detection module 153, can serve to mitigate problems that can occur when multiple people speak simultaneously on a conference call, thereby increasing the effectiveness of multi-party conference calls.

In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications (e.g., 152, 154, 156, 157, 158) and specifically conference call application 152 stored thereon. Processor 102 can access RSD 136 to provision electronic device 100 with program code that, when executed/processed by processor 102, the program code causes or configures processor 102 and/or generally electronic device 100, to provide the various conference call overlapping audio detection and mitigation functions described herein.

Electronic device 100 includes an integrated display 130 which incorporates a tactile, touch screen interface 131 that can receive user tactile/touch input. As a touch screen device, integrated display 130 allows a user to provide input to or to control electronic device 100 by touching features within the user interface presented on display 130. Tactile, touch screen interface 131 can be utilized as an input device. The touch screen interface 131 can include one or more virtual buttons, indicated generally as 115. In embodiments, when a user applies a finger on the touch screen interface 131 in the region demarked by the virtual button 115, the touch of the region causes the processor 102 to execute code to implement a function associated with the virtual button. In some implementations, integrated display 130 is integrated into a front surface of electronic device 100 along with front ICDs, while the higher quality ICDs are located on a rear surface.

Electronic device 100 can further include microphone 108, one or more output devices such as speakers 144, and one or more input buttons, indicated as 107a and 107b. While two buttons are shown in FIG. 1, other embodiments may have more or fewer input buttons. Microphone 108 can also be referred to as an audio input device. During a conference call, when microphone 108 is unmuted, microphone 108 captures speech and other audio in the surrounding area and presents that captured speech and other audio to the other participants in the conference call. In some embodiments, microphone 108 may be used for identifying a user via voiceprint, voice recognition, and/or other suitable techniques. Input buttons 107a and 107b may provide controls for volume, power, and ICDs 132, 133. Additionally, electronic device 100 can include input sensors 109 (e.g., sensors enabling gesture detection by a user).

Electronic device 100 further includes haptic touch controls 145, vibration device 146, fingerprint/biometric sensor 147, global positioning system (GPS) device 160, and motion sensor(s) 162. Vibration device 146 can cause electronic device 100 to vibrate or shake when activated. Vibration device 146 can be activated during an incoming call or message in order to provide an alert or notification to a user of electronic device 100. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user. In some embodiments, the biometric sensor 147 can supplement an ICD (camera) for user detection/identification.

GPS device 160 can provide time data and location data about the physical location of electronic device 100 using geospatial input received from GPS satellites. Motion sensor(s) 162 can include one or more accelerometers 163 and gyroscope 164. Motion sensor(s) 162 can detect movement of electronic device 100 and provide motion data to processor 102 indicating the spatial orientation and movement of electronic device 100. Accelerometers 163 measure linear acceleration of movement of electronic device 100 in multiple axes (X, Y and Z). Gyroscope 164 measures rotation or angular rotational velocity of electronic device 100. Electronic device 100 further includes a housing 137 (generally represented by the thick exterior rectangle) that contains/protects the components internal to electronic device 100.

Electronic device 100 also includes a physical interface 165. Physical interface 165 of electronic device 100 can serve as a data port and can be coupled to charging circuitry 135 and device battery 143 to enable recharging of device battery 143.

Electronic device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables electronic device 100 to communicate with wireless communication network 132 and with other devices, such as server 175 and connected second communication devices 176, via one or more of data, audio, text, and video communications. Communication module 158 can support various communication sessions by electronic device 100, such as audio communication sessions, video communication sessions, text communication sessions, exchange of data, and/or a combined audio/text/video/data communication session. The conference calls described herein are examples of audio and video communication sessions.

WCS 142 and antennas 148 allow electronic device 100 to communicate wirelessly with wireless communication network 132 via transmissions of communication signals to and from network communication devices, such as base stations or cellular nodes, of wireless communication network 132. Wireless communication network 132 further allows electronic device 100 to wirelessly communicate with server 175 and second communication devices 176, which can be similarly connected to wireless communication network 132. In one or more embodiments, various functions that are being performed on communications device 100 can be supported using or completed via/on server 175. In one or more embodiments, server 175 can be a conference call server or include conference call server functionality.

Electronic device 100 can also wirelessly communicate, via wireless interface(s) 178, with wireless communication network 132 via communication signals transmitted by short range communication device(s) to and from an external wireless interface, such as wireless fidelity (WiFi) router or Bluetooth (BT) transceiver 166, which is communicatively connected to network 170 that in turn is connected with wireless communication network 132. Server 175 can be connected to network 170, which provides connectivity for multiple devices across a wide area network or local area network, etc. Wireless interface(s) 178 can be a short-range wireless communication component providing Bluetooth, near field communication (NFC), and/or Wi-Fi connections. In an embodiment, WCS 142 with antenna(s) 148 and wireless interface(s) 178 collectively provide wireless communication interface(s) of electronic device 100. The device 100 of FIG. 1 is only a specific example of devices that can be used with embodiments of the present invention. Devices that utilize disclosed embodiments can include, but are not limited to, a smartphone, a tablet computer, a laptop computer, a desktop computer, a wearable computer, and/or other suitable electronic device.

Figure 2:
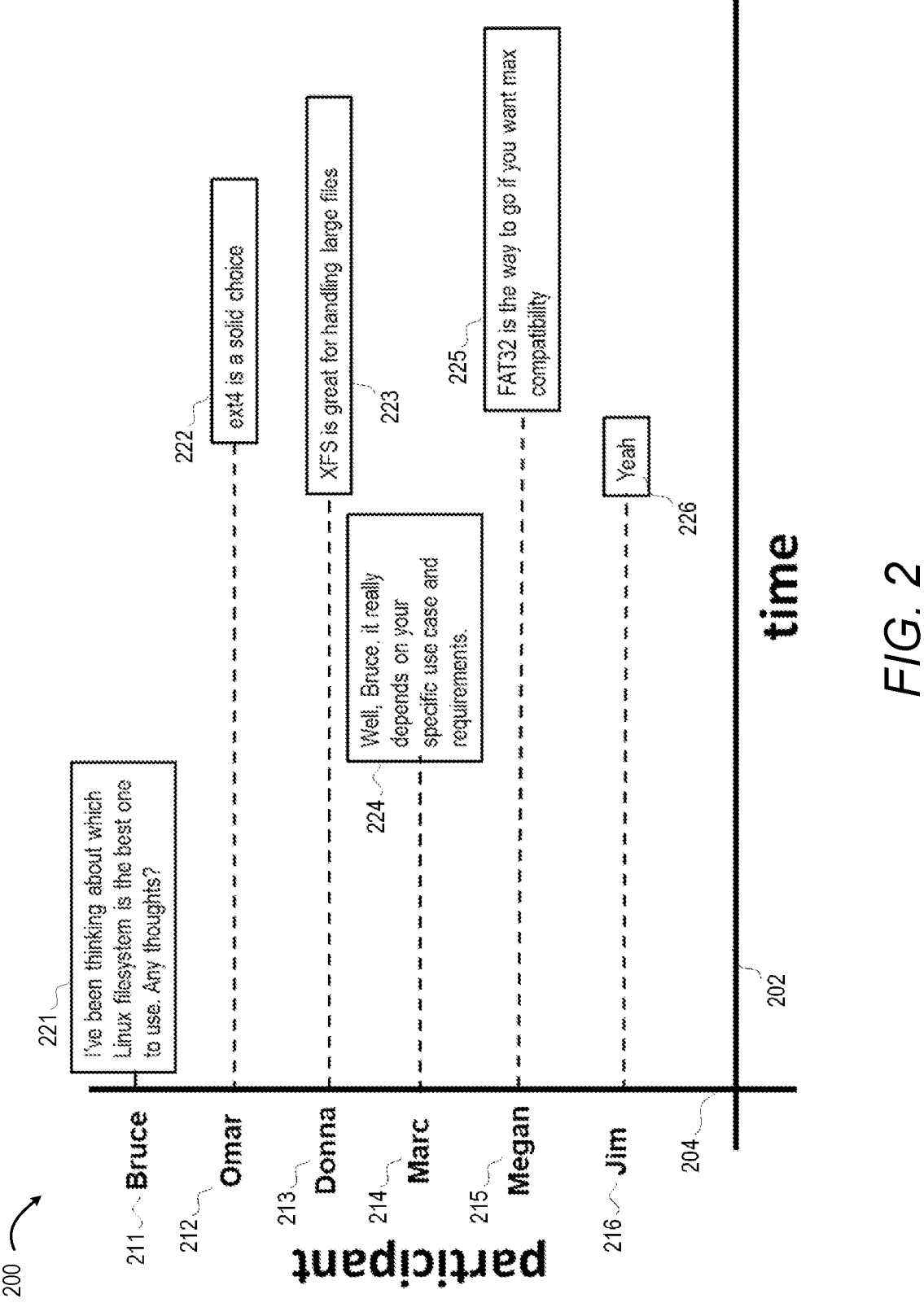
FIG. 2 is a time graph indicating an example multi-party conference call dialog with overlapping speakers.

FIG. 2 is a time graph 200 indicating exemplary multiparty conference call dialog with overlapping speaking participants (or "speakers"). The dialog depicted in FIG. 2 is used to further describe features and functions of disclosed embodiments that are illustrated in subsequent figures. Graph 200 includes a horizontal axis 202 representing time, and a vertical axis 204, which includes discrete indications of call participants. Indicated at 211 is a call participant 'Bruce' that is associated with dialog indicated at box 221 which states "I've been thinking about which Linux filesystem is the best one to use. Any thoughts?" Indicated at 214 is another call participant 'Marc' that is associated with dialog indicated at box 224 which states "Well, Bruce, it really depends on your specific use case and requirements." As can be seen in graph 200, the dialog of Bruce does not overlap with the dialog of Marc. Effectively, Bruce asked a question, and Marc answered that question after Bruce stopped speaking.

Indicated at 212 is another call participant 'Omar' that is associated with dialog indicated at box 222 which states "ext4 is a solid choice." Indicated at 213 is another call participant 'Donna' that is associated with dialog indicated at box 223 which states "XFS is great for handing large files." Indicated at 215 is another call participant 'Megan' that is associated with dialog indicated at box 225 which states "FAT32 is the way to go if you want max compatibility." Indicated at 216 is another call participant 'Jim' that is associated with dialog indicated at box 226 which states "Yeah" in response to Marc's comment indicated at 224.

As can be seen in graph 200, the dialogs of Omar, Donna, Megan, and Jim have temporal overlap with at least one other call participant. The overlap can create difficulties for the call participants regarding understanding what was said, and identifying who said which phrases. Disclosed embodiments mitigate these issues, as is further elaborated in the upcoming description and figures.

Figure 3A:
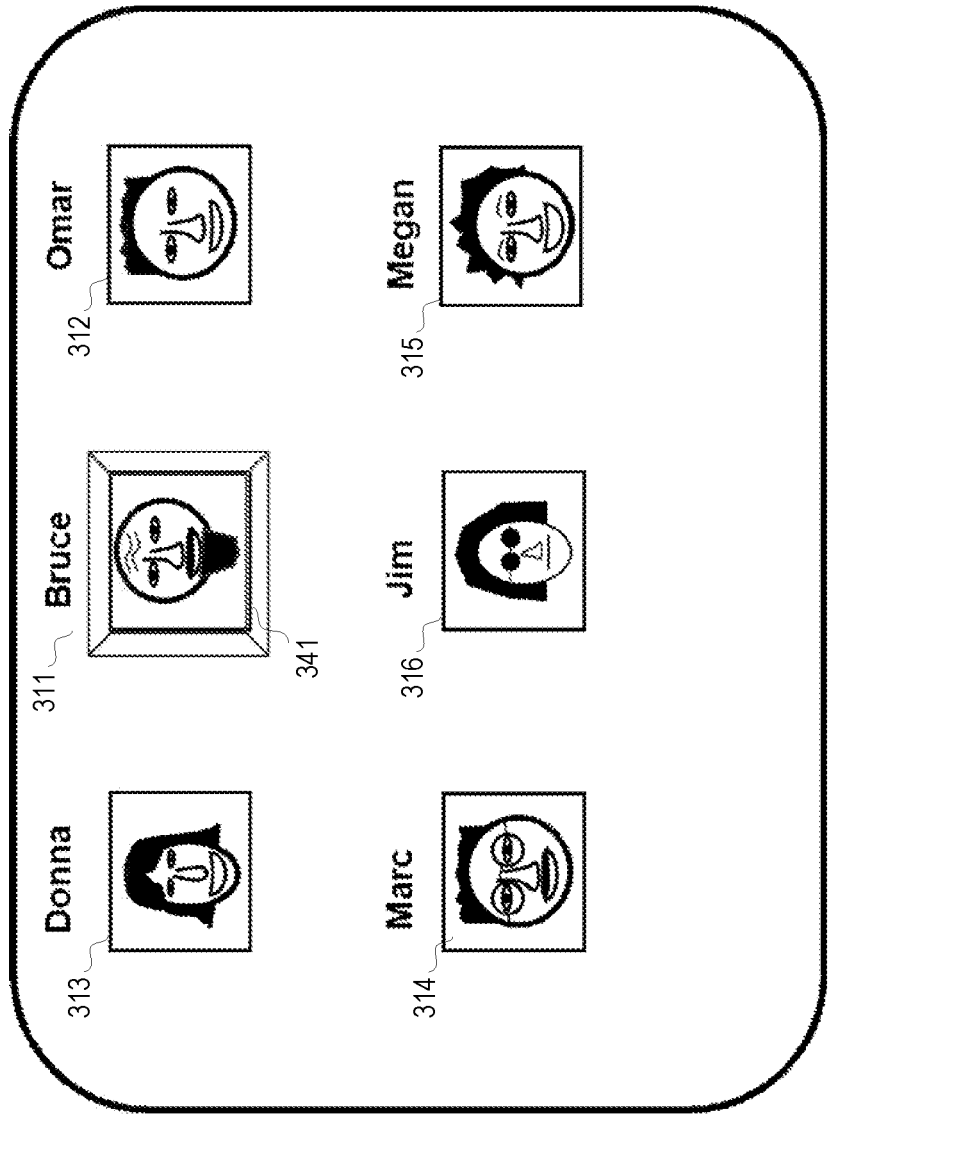
FIG. 3A is an exemplary conference call dashboard presenting multiple conference call participants, with a first speaker visually highlighted, according to one or more embodiments.

FIG. 3A is an exemplary conference call dashboard 300 presenting multiple conference call participants, with a first speaker visually highlighted, according to one or more embodiments. Conference call dashboard 300 includes a participant region for each of a plurality of call participants. Participant region 311 corresponds to participant 'Bruce' who is indicated at 211 of FIG. 2. Participant region 312 corresponds to participant 'Omar' who is indicated at 212 of FIG. 2. Participant region 313 corresponds to participant 'Donna' who is indicated at 213 of FIG. 2. Participant region 314 corresponds to participant 'Marc' who is indicated at 214 of FIG. 2. Participant region 315 corresponds to participant 'Megan' who is indicated at 215 of FIG. 2. Participant region 316 corresponds to participant 'Jim' who is indicated at 216 of FIG. 2. FIG. 3A depicts a point in time when Bruce is speaking the dialog that is indicated in box 211 of FIG. 2. Accordingly, a visual highlight indication 341 is shown around participant region 311, indicating that Bruce is a current speaker.

In one or more embodiments, the participant regions included in a conference call dashboard can include text, such as the name or initials of a participant. In one or more embodiments, the participant regions included in a conference call dashboard can include an image, such as an icon, digital photograph, or avatar of a participant. In one or more embodiments, the conference call is a video conference call. In one or more embodiments, the participant regions included in a conference call dashboard can include a series of video images, such as from a video stream captured by an image capturing device of an electronic device used by a participant for participation in the conference call. In the case of video images, disclosed embodiments may utilize facial element recognition, including, but not limited to, identification of a mouth and/or lips of a participant within the video images. In one or more embodiments, in addition to audio information, the detection of motion of the lips and/or mouth may be used as criteria in determining if a conference call participant is speaking. In one or more embodiments, dedicated artificial intelligence (AI) engines 105 of FIG. 1 may be used in identifying the motion of lips and/or mouth, and/or other facial cues indicative of speech generation.

Figure 3B:
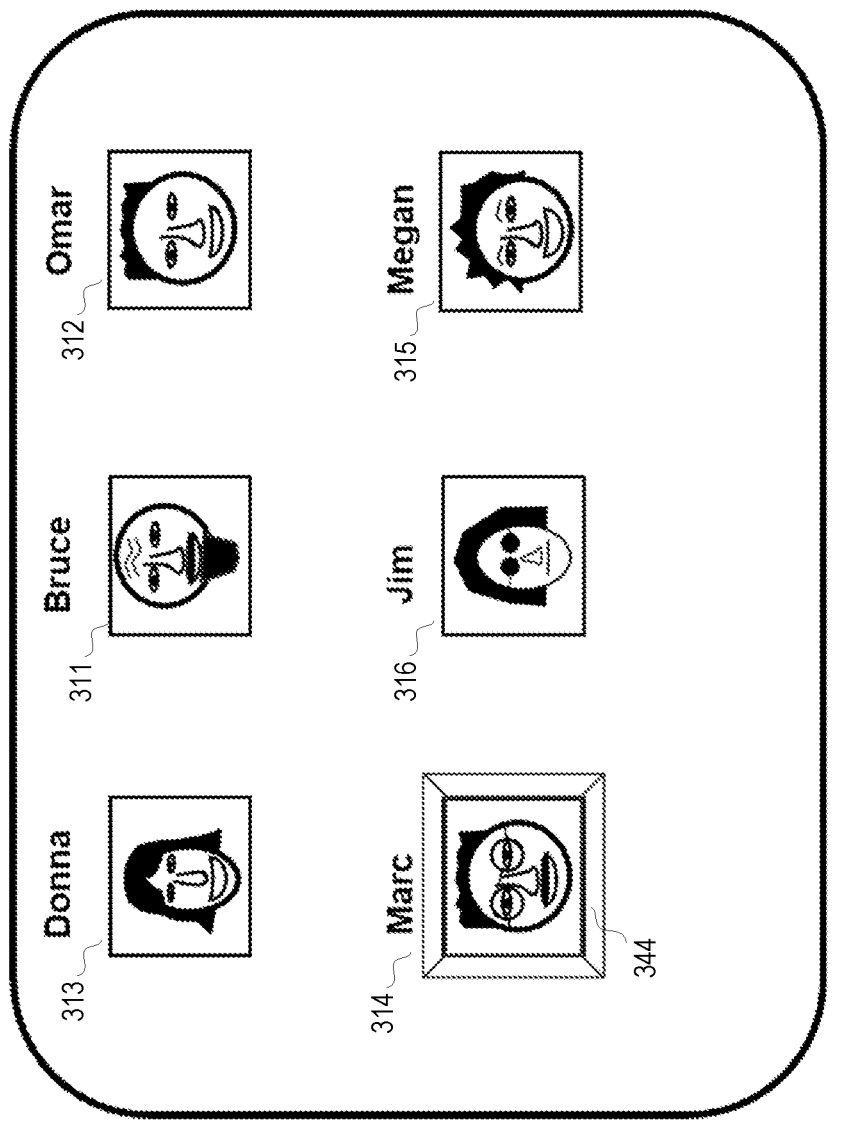
FIG. 3B is the exemplary conference call dashboard presenting the conference call participants of FIG. 3A with a second speaker visually highlighted, according to one or more embodiments.

FIG. 3B visually depicts a later point in time when Marc is speaking the dialog that is indicated in box 214 of FIG. 2. Accordingly, a visual highlight indication 344 is shown around participant region 314, indicating that Marc is a current speaker.

Figure 3C:
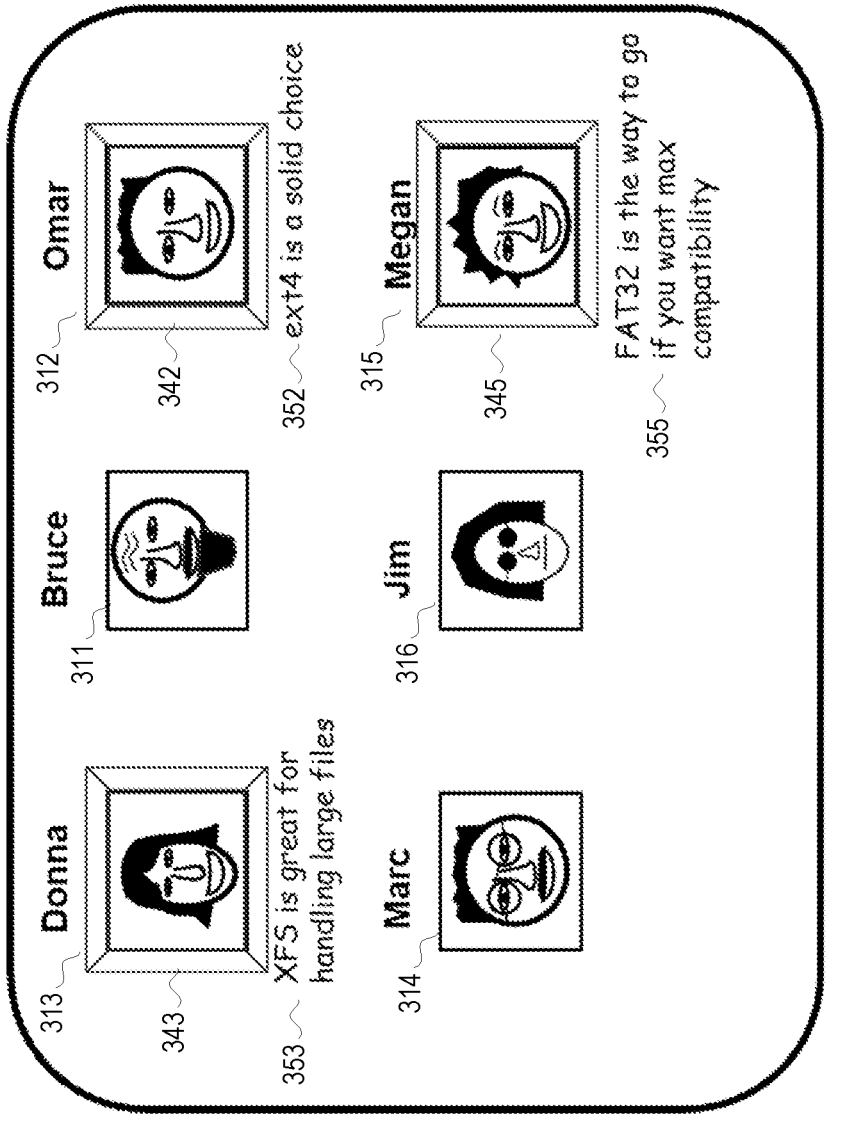
FIG. 3C is the exemplary conference call dashboard of FIG. 3A with overlapping speakers visually highlighted, according to one or more embodiments.

FIG. 3C visually depicts a point in time when Donna is speaking the dialog that is indicated in box 213 of FIG. 2, while Omar is speaking the dialog indicated in box 212 in FIG. 2, and Megan is speaking the dialog indicated in box 215 of FIG. 2. As indicated in FIG. 3C, and with reference to the corresponding dialog shown in FIG. 2, the participants Donna, Omar, and Megan are speaking substantially simultaneously, with overlaps of a portion of all three speeches/dialogs occurring at a same time. Accordingly, a visual highlight indication 343 is shown around participant region 313, indicating that Donna is a current speaker, a visual highlight indication 342 is shown around participant region 312, indicating that Omar is a current speaker, and a visual highlight indication 345 is shown around participant region 315, indicating that Megan is a current speaker. The simultaneous presence of the three visual highlight indications (342, 343, and 345) indicate that there is temporal audio overlap among participants Donna, Omar, and Megan.

Furthermore, in accordance with one aspect of the disclosure, a text transcription 353 is positioned proximal to the participant region 313 and includes the text corresponding to the dialog from box 223 of FIG. 2. Similarly, a text transcription 352 is positioned proximal to the participant region 312 and includes the text corresponding to the dialog from box 222 of FIG. 2, and a text transcription 355 is positioned proximal to the participant region 315 and includes the text corresponding to the dialog from box 225 of FIG. 2. Accordingly, participants viewing the conference call dashboard shown in FIG. 3 can observe which participants are responsible for the overlap, and what dialog is originating from the participants that are causing the overlap.

As stated previously, 'Jim', participant 216 of FIG. 2, utters the audio indicated at box 226, which overlaps with the audio from at least one other participant on the call. In one or more embodiments, an actionable overlap incident is computed in response to computing an overlap duration that exceeds a predetermined threshold duration. The participant 'Jim' simply uttered the word 'Yeah' which results in a relatively short audio duration. In one or more embodiments, the predetermined threshold prevents utterances such as short acknowledgement phrases (e.g., 'Yes,' 'Right,' 'OK,' etc.) from causing a visual distraction by presenting transcribed text of those short utterances. Thus, in one or more embodiments, acknowledgement phrases such as 'Yes,' 'Agree,' and 'Right' do not trigger an actionable overlap incident, as the duration of the audio associated with the acknowledging phrases is below the predetermined threshold. Accordingly, these acknowledgement phrases do not cause generation of a text transcript and/or visual highlighting of a corresponding speaking participant to be rendered on the conference call dashboard. In this way, visual distractions from short utterances such as acknowledgement phrases are minimized, while substantive dialog is rendered on the conference call dashboard.

One or more embodiments can include visually highlighting participant regions corresponding to the at least two call participants associated with the overlapping audio. One or more embodiments can include, in response to determining that an audio transcript display option for the conference call is activated, visually highlighting participant regions corresponding to just the at least two call participants associated with the overlapping audio. Particularly, as shown in FIG.

3C, the text transcriptions that are rendered are rendered in proximity to a visual indication corresponding to the call participant. One or more embodiments of the disclosure can include: determining whether an audio transcript display option is activated for the conference call; and in response to determining that an audio transcript display option for the conference call is not activated: transcribing the detected audio from each of the at least two call participants into a corresponding text transcription; and displaying the transcribed text associated with each of the at least two call participants in one of (i) a corresponding participant region on the conference call dashboard and (ii) a participant list, with the transcribed text associated with a corresponding participant identification (ID) of the at least two call participants.

Figure 3D:
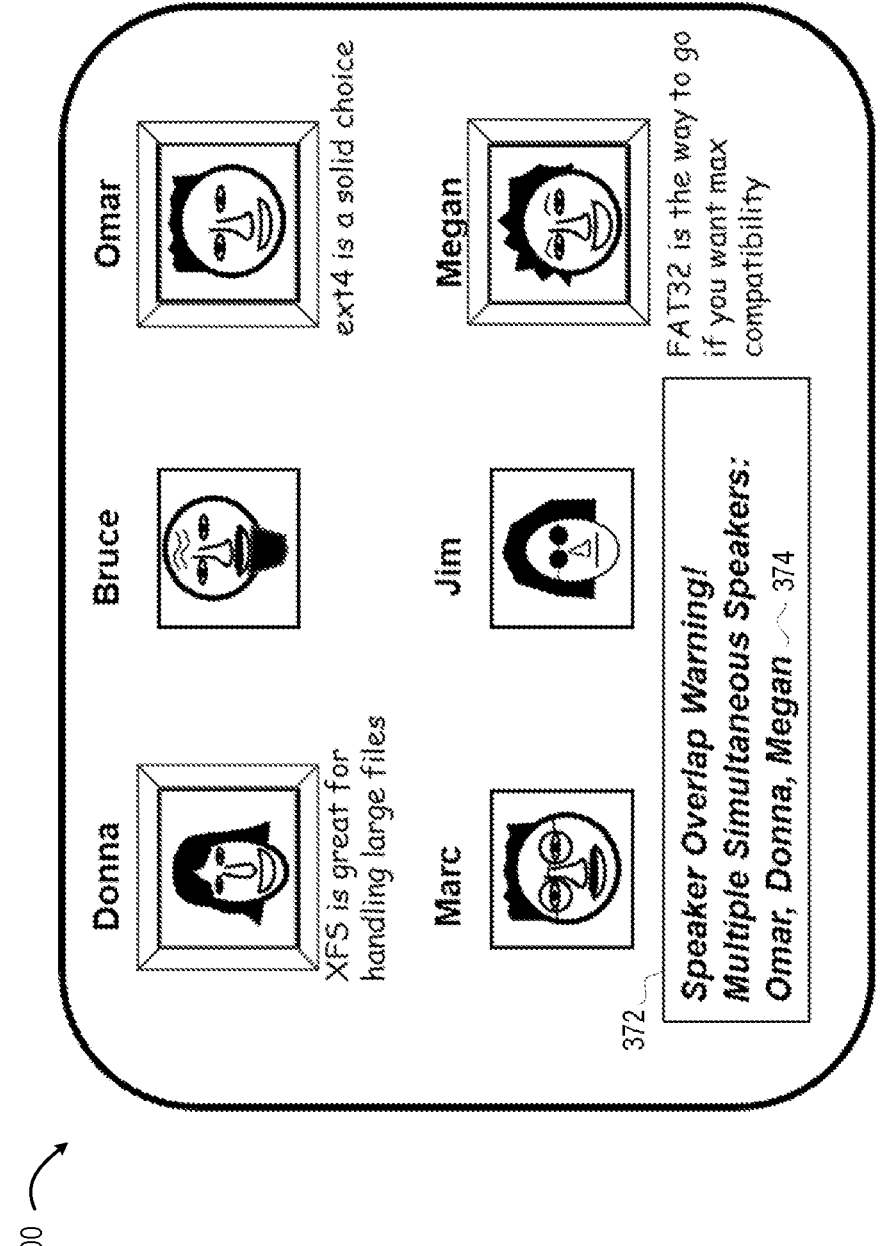
FIG. 3D is the exemplary conference call dashboard of FIG. 3C including a speaker overlap warning, according to one or more embodiments.

FIG. 3D is an exemplary conference call dashboard including a speaker overlap warning, according to one or more embodiments. As presented in FIG. 3D, there is an overlap warning 372 shown that includes a list 374 of speakers contributing to overlapping audio. In one or more embodiments, the overlap warning 372 may be presented to each conference call participant. In one or more embodiments, the overlap warning 372 is only presented to the participants that are contributing to the audio overlap. Accordingly, disclosed embodiments can identify the participants that are causing audio overlap, and the provided overlap warnings can help promote fewer incidents of overlap by alerting participants who are contributing to the undesirable audio overlap situations. One or more embodiments can include transmitting an overlap warning to at least two call participants. In one or more embodiments, transmitting the overlap warning can further include compiling a list comprising each of the at least two participants.

Figure 4:
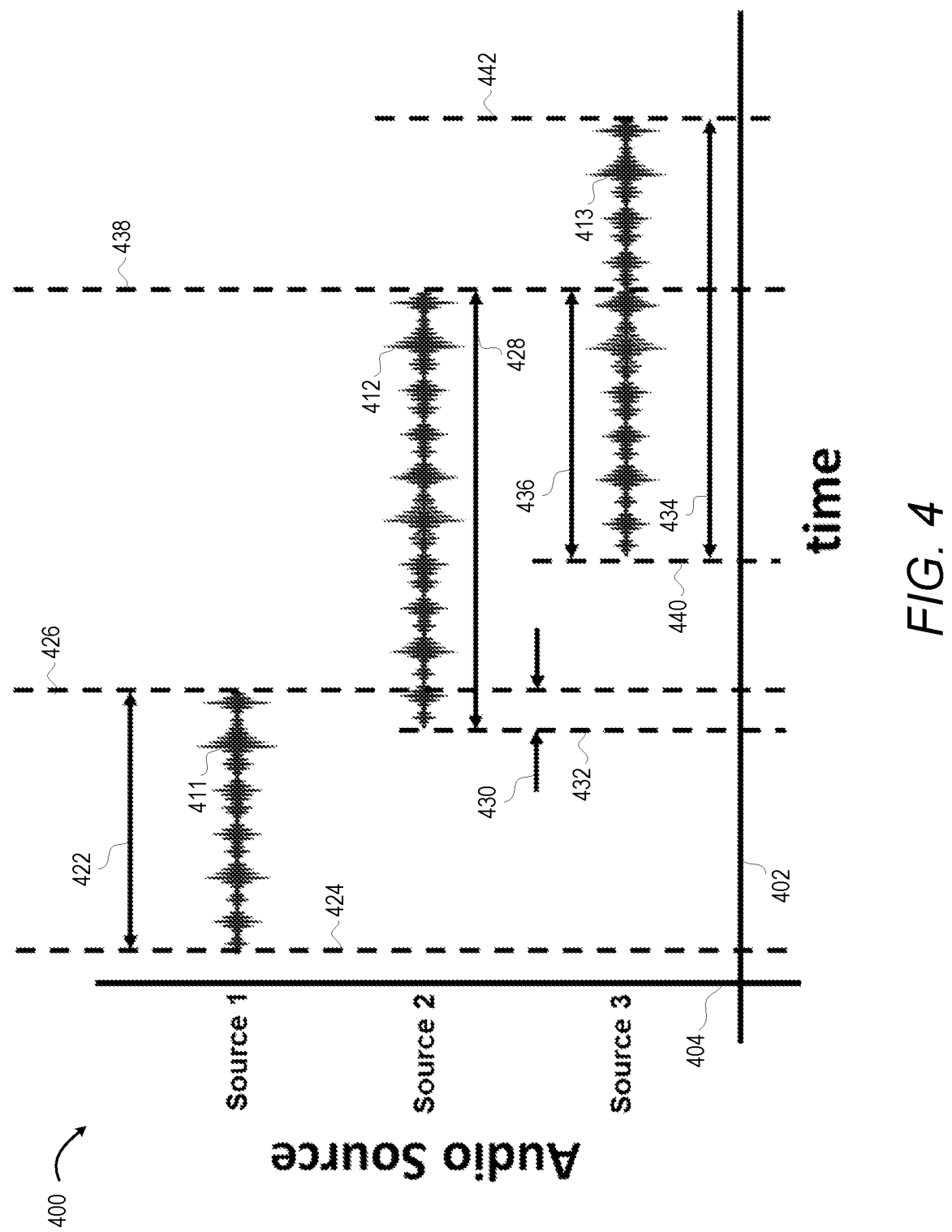
FIG. 4 is a time graph showing detection of overlapping audio, according to one or more embodiments.

FIG. 4 is a time graph 400 showing detection of overlapping audio, according to one or more embodiments. Graph 400 includes a horizontal axis 402 representing time, and a vertical axis 404, that includes audio sources corresponding to multiple call participants. The three sources indicated, source 1, source 2, and source 3, can each correspond to a different call participant. As shown in graph 400, audio waveform 411 is associated with source 1, and has a duration 422 as denoted by starting point 424 and ending point 426. Similarly, audio waveform 412 is associated with source 2, and has a duration 428 as denoted by starting point 432 and ending point 438, and audio waveform 413 is associated with source 3, and has a duration 434 as denoted by starting point 440 and ending point 442.

Graph 400 depicts overlap region 430 that includes some overlap between waveform 411 and waveform 412. Particularly, the starting point 432 of waveform 412 occurs temporally ahead of the ending point 426 of waveform 411. Accordingly, starting point 432 marks the start of overlap region 430, and ending point 426 marks the end of overlap region 430. Similarly, graph 400 depicts overlap region 436 that includes some overlap between waveform 412 and waveform 413. Particularly, the starting point 440 of waveform 413 occurs temporally ahead of the ending point 438 of waveform 412. Accordingly, starting point 440 marks the start of overlap region 436, and ending point 438 marks the end of overlap region 436. Thus, as can be seen in graph 400, overlap region 430 is of a shorter duration than overlap region 436. In embodiments, a predetermined threshold can be established. If an overlap region has a duration that is shorter than the predetermined threshold, than the overlap region is ignored. Otherwise, the overlap region is treated as an actionable overlap incident, and is processed by the device processor, causing the processor to render and/or present indications and/or text transcripts such as depicted in FIG. 3C and/or FIG. 3D. In one or more embodiments, the predetermined threshold for treating an overlap audio incident as an actionable overlap incident has a value that ranges from 800 milliseconds to 2 seconds. Other embodiments may have a different predetermined threshold duration that is outside of that range. Based on that predetermined threshold value, in the example shown in FIG. 4, if overlap region 430 is 300 milliseconds, and overlap region 436 is 4.6 seconds, then overlap region 430 is ignored, while overlap region 436 is processed as an actionable overlap incident.

In one or more embodiments, the association of an audio source to a given call participant can be based on source origination. As an example, audio from source 1 can originate from a first internet protocol (IP) address and/or source port, audio from source 1 can originate from a second IP address and/or source port, and audio from source 3 can originate from a third IP address and/or source port. In one or more embodiments, the processor of an electronic device correlates an audio source to a source origination. In one or more embodiments, a caller telephone number may be used for correlating an audio source to a source origination. In one or more embodiments, the processor may generate a text transcript corresponding to each audio source. In one or more embodiments, the text may only be rendered when the corresponding audio waveform is associated with an actionable overlap incident. In some embodiments, the audio waveforms may further include metadata. The metadata can include source information. In one or more embodiments, the metadata can include an ID3 tag. An ID3 tag is a metadata container used to store information about a digital audio file. In one or more embodiments, the ID3 tag can include an origination field that includes a username, and/or name of a conference call participant that originated the audio waveform. Disclosed embodiments can use the origination field to determine which audio waveforms originated from a given participant, and perform speech-to-text processing on the audio waveforms, and save the resultant text in memory. In response to detecting an actionable overlap, transcript text associated with the participants causing the overlap, as indicated by the origination field, can be rendered as indicated in FIG. 3C.

Disclosed embodiments can utilize automatic speech recognition (ASR) to generate text transcript data. Disclosed embodiments can include performing an acoustic analysis on waveforms, such as those depicted in FIG. 4. In one or more embodiments, each incoming audio waveform is preprocessed to extract relevant features. The preprocessing can include breaking the audio into small units referred to as "frames." In one or more embodiments, each frame includes 10-30 milliseconds of sound. In one or more embodiments, for each frame, a set of acoustic features is computed. The features can include, but are not limited to, frequency coefficients that capture spectral information, and delta and delta-delta coefficients, which represent changes in the coefficients over time. These features are used to create a representation of the audio suitable for further analysis. The further analysis can include phoneme analysis. Phonemes are the smallest distinctive units of sound in a language. In one or more embodiments, the audio waveforms are converted to sequences of phonemes. The sequences of phonemes are then input to a language modeling process to account for the grammar, syntax, and context of spoken language, as well as performing disambiguation based on the context of detected words. In one or embodiments, some or all of the automatic speech recognition is performed by dedicated artificial intelligence (AI) engines 105 of FIG. 1.

Figure 5:
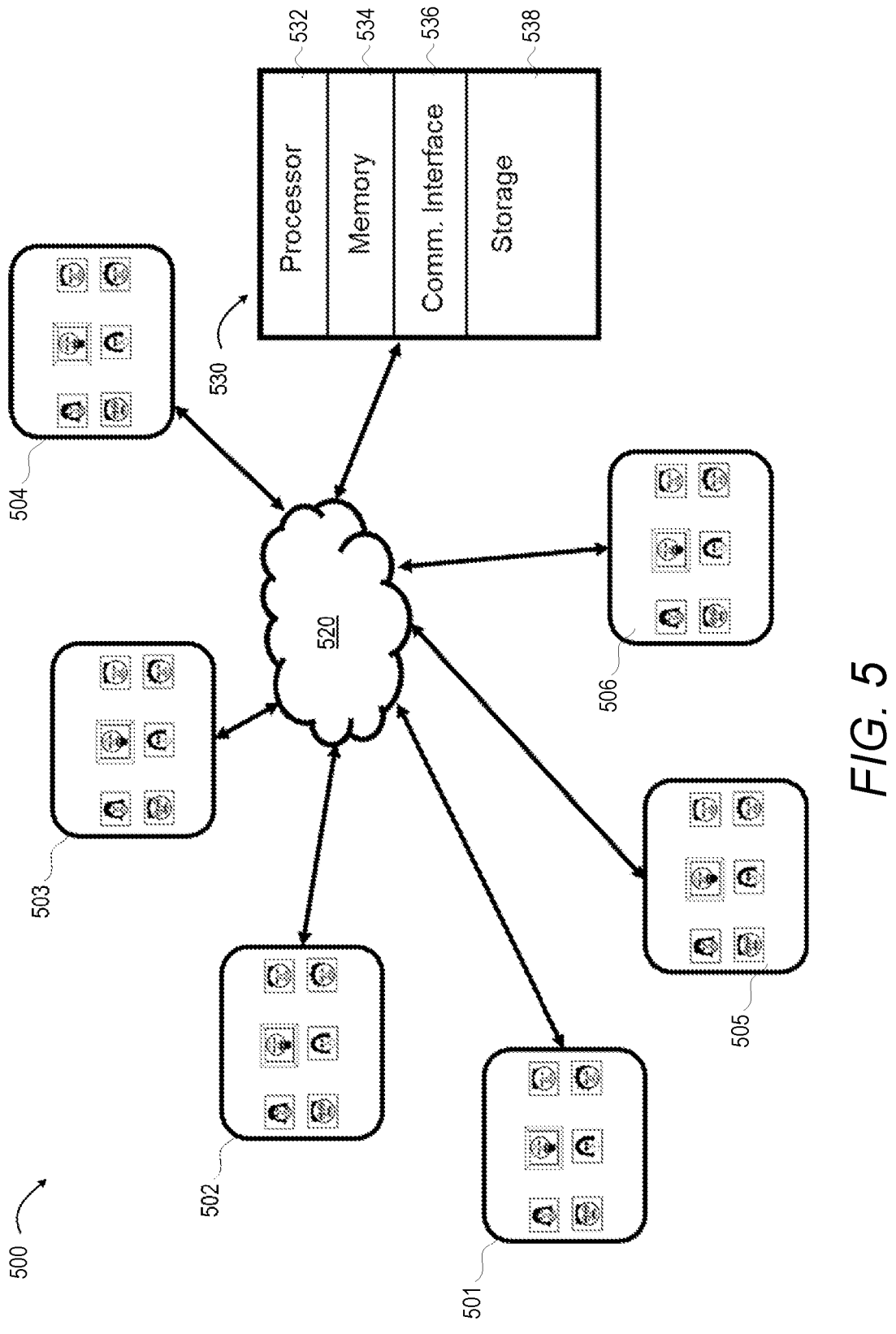
FIG. 5 is a block diagram of a conferencing system supporting a conference call with multiple participants, according to one or more embodiments.

FIG. 5 is a block diagram of a conferencing network 500, according to one or more embodiments. In one or more embodiments, conference network 500 includes a conference call server 530. In one or more embodiments, the conference call server 530 comprises a processor 532, a memory 534 coupled to the processor 532, and storage 538. The memory 534 contains program instructions, that when executed by the processor 532, can perform processes, techniques, and implementations of the disclosed embodiments. The conference call server 530 can execute instructions and functions in memory 534 for performing signaling functions such as initiating and managing connections between participants. In one or more embodiments, the conference call server 530 handles tasks such as call setup, authentication, and signaling between clients. Conference call server 530 may also perform media functions, including, but not limited to, encoding, decoding, and transcoding to ensure compatibility across various devices and network conditions. Conference call server 530 may also perform multiplexing and routing functions for determining how audio and video streams are distributed among participants. Moreover, in one or more embodiments, conference call server 530 may perform some or all of the speech-to-text transcription functions of disclosed embodiments. While one conference call server 530 is shown in FIG. 5, in practice, there can be multiple servers and/or server instances in disclosed embodiments. The servers can include virtual machines, containers, and/or bare metal servers. In some embodiments, different servers may perform different functions and/or participate in load balancing in order to maintain scalability with multiple call participants. Memory 534 can include dynamic random-access memory (DRAM), static random-access memory (SRAM), magnetic storage, and/or a read only memory such as flash, EEPROM, optical storage, or other suitable non-transitory computer-readable medium. In some embodiments, storage 538 may include one or more magnetic storage devices such as hard disk drives (HDDs). Storage 538 may additionally include one or more solid state drives (SSDs). In one or more embodiments, the conference call server 530 can include communication interface 536, which can be configured by the processor 532, to interact with network 520, which can include the Internet, a wide area network, a local area network, or other suitable network. In one or more embodiments, server 175 of FIG. 1 may be similar to, and perform similar functions to, the conference call server 530.

Network 500 may include one or more client devices, indicated as 501, 502, 503, 504, 505, and 506. Client devices 501-506 can include a laptop computer, desktop computer, tablet computer, smartphone, wearable computer, or other suitable computing device. While three client devices are shown in FIG. 5, in practice, there can be more or fewer client devices in network 500. In one or more embodiments, the features and functions of disclosed embodiments can be performed solely within a client device (e.g., 501-506), solely within conference call server 530, and/or a combination of both client device(s) (501-506) and server 530.

Figure 7:
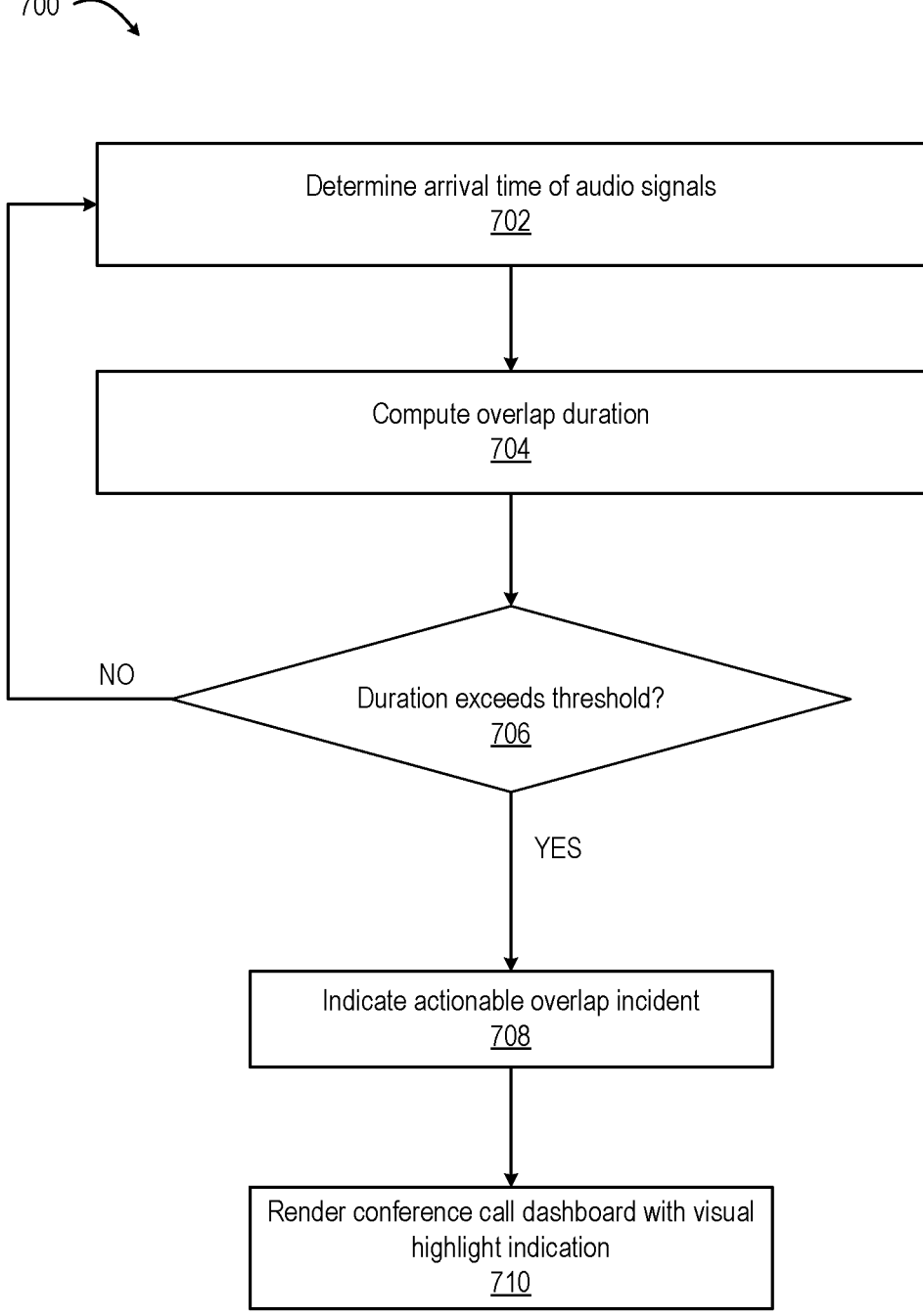
FIG. 7 depicts a flowchart of a method for indicating an actionable overlap incident during a conference call, according to one or more embodiments.

Referring now to the flowcharts presented by FIGS. 6-7, the descriptions of the methods in FIGS. 6-7 are provided with general reference to the specific components and features illustrated within the preceding FIGS. 1-5. Specific components referenced in the methods of FIGS. 6-7 may be identical or similar to components of the same name used in describing preceding FIGS. 1-5. In one or more embodiments, processor 102 (FIG. 1) configures electronic device 100 (FIG. 1) to provide the described functionality of the methods of FIGS. 6-7 by executing program code for one or more modules or applications provided within system memory 120 of electronic device 100.

FIG. 6 depicts a flowchart of a method 600 for detecting and indicating voice overlap in a conference call, according to one or more embodiments. The method 600 starts at block 601, where a connection to a conference call that comprises a plurality of call participants is detected. The method continued to block 602, where a conference call dashboard is rendered, such as depicted in FIG. 3A-FIG. 3D. The method 600 continues to block 604, where audio inputs are monitored. The method 600 continues to block 606, where a check is made to determine if overlapping audio is detected. This check can include identifying overlaps such as depicted at 436 of FIG. 4. If, at block 606, overlapping audio is not detected, then the method 600 continues to block 608, where any overlap indications are removed, if present. The overlap indications that are removed can include, but are not limited to, text transcription such as 353 of FIG. 3C, as well as visual highlight indications such as shown at 343 of FIG. 3C. The method 600 then returns to block 604 to continue monitoring audio inputs.

If, at block 606, overlapping audio is detected, then the method 600 continues to block 610 where call participants with audio overlap are identified. The method 600 then continues to block 612 where participant regions corresponding to call participants identified with overlap are highlighted. An example of multiple highlighted participant regions is illustrated in FIG. 3C. Optionally, at block 613, a check is made to determine if a transcript feature is off. A transcript feature is a feature provides with some conference call systems that presents transcript text in a 'sequential mode' in which transcript text is displayed in a general region, such as at the bottom of the conference call dashboard. Thus, the 'sequential mode' is somewhat similar to the way closed captions and subtitles are displayed in television programming. In one or more embodiments, if the transcript feature is on, then for the purposes of conveying overlapping speech, the transcript mode is switched from a sequential mode to an individual mode, where individual transcripts are rendered proximate to corresponding highlighted participants. Accordingly. if, at block 613, the transcript feature is determined to be on, then the method 600 continues to block 614 which includes switching the transcript presentation feature from presenting sequential text transcript in a designated transcript region of the user interface (screen) to presenting individual text transcriptions for the individual speakers of overlapping dialog that is presented in proximity to the visual highlight indication corresponding to the call participant that uttered the dialog. If (at block 613) the transcript feature is off or following block 614, the method 600 continues to block 616, which provides presenting a text transcription of each of the overlapping dialog in proximity to the visual highlight indication corresponding to the call participant that uttered the dialog. An example of presented text transcriptions associated with overlapping dialog is illustrated in FIG. 3C. The method 600 then returns to block 604 to continue monitoring audio inputs.

FIG. 7 depicts a flowchart of a method 700 for indicating an actionable overlap incident, according to one or more embodiments. The method 700 starts at block 702, where arrival times of multiple audio signals are determined. Examples of audio arrival times are depicted at 424, 432, and 440 of FIG. 4. The method 700 continues to block 704, where an overlap duration amongst the audio signals is computed. Examples of overlap durations are depicted at 430 and 436 of FIG. 4. The method 700 continues to block 706, where a check is made to determine if the overlap duration exceeds a predetermined threshold. If, at block 706, a determination is made that the overlap duration does not exceed the predetermined threshold, then the method 700 returns to block 702 to continue monitoring the incoming audio for overlaps. If, at block 706, a determination is made that the overlap duration does exceed the predetermined threshold, then the method 700 continues to block 708, where an actionable overlap incident is indicated. The method 700 continues to block 710 with the rendering of a conference call dashboard with elements including, but not limited to, a visual highlight indication. An example of such a rendering is shown at 343 of FIG. 3C, with text transcription such as 353 of FIG. 3C, and/or overlap warning 372, as depicted in FIG. 3D.

In one or more embodiments, detecting overlapping audio comprises: determining an arrival time of audio data from each call participant; computing an overlap duration for audio data for each call participant; and indicating an actionable overlap incident in response to computing an overlap duration that exceeds a predetermined threshold duration.

As can now be appreciated, the disclosed embodiments provide improvements in electronic devices that include conference calling by providing dynamic surfacing of transcripts for overlapping audio communication. The surfacing includes presenting text transcriptions corresponding to multiple call participants that are speaking simultaneously. The text transcriptions are presented proximal to visual indications of the corresponding call participants on a conference call dashboard, enabling convenient identification of speakers that are speaking simultaneously during a conference call, as well as what each call participant said. Thus, disclosed embodiments identify overlapping audio speech in a multi-party conference call, and provide a visual indication of the overlap, text transcription of overlapping audio, and/or a warning about overlapping audio to two or more participants. In one or more embodiments, a minimum number of participants is required before the features of disclosed embodiments are used. In one or more embodiments, the minimum number of participants can be 3 participants. The minimum number of participants can depend on the context of the conference call, such as when the conference call is an audio conference call or when the participants to a video conference call are not utilizing live video during the video conference. In some embodiments, the minimum number of participants, overlap duration required to trigger an actionable overlap incident, and/or other parameters, are user-configurable. Disclosed embodiments serve to reduce confusion due to overlapping conversations, thereby improving the overall user-experience and productivity of a conference call.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a display;
a microphone;
a memory having stored thereon a conference calling application and voice overlap detection module;
a network interface which enables the electronic device to connect to, and complete conference calls with, at least one second electronic device; and
a processor communicatively coupled to the display, the microphone, the memory, and the network interface, and which executes program code of the conference calling application and the voice overlap detection module, which causes the electronic device to:
detect connection to a conference call comprising a plurality of call participants;
render a conference call dashboard on the display, the conference call dashboard including a participant region for each participant of the plurality of call participants;
detect overlapping audio originating from at least two call participants; and
in response to detecting the overlapping audio, present, on the display, a text transcription of a respective audio of each of the at least two participants identified.

2. The electronic device of claim 1, wherein further, the processor visually highlights participant regions corresponding to the at least two call participants associated with the overlapping audio.

3. The electronic device of claim 1, wherein to present the text transcription, the processor:
determines whether an audio transcript display option is activated for the conference call; and
in response to determining that an audio transcript display option for the conference call is not activated:
transcribes the detected audio from each of the at least two call participants into a corresponding text transcription; and
scription; and displays the transcribed text associated with each of the at least two call participants in one of (i) a corresponding participant region on the conference call dashboard and (ii) a participant list, with the transcribed text associated with a corresponding participant identification (ID) of the at least two call participants.

4. The electronic device of claim 3, wherein in response to determining that an audio transcript display option for the conference call is activated, the processor visually highlights participant regions corresponding to just the at least two call participants associated with the overlapping audio.

5. The electronic device of claim 1, wherein to detect overlapping audio originating from at least two call participants, the processor:
determines an arrival time of audio data from each call participant;
computes an overlap duration for audio data for each call participant; and
indicates an actionable overlap incident in response to computing an overlap duration that exceeds a predetermined threshold duration.

6. The electronic device of claim 1, wherein further, the processor transmits an overlap warning to at least two call participants.

7. The electronic device of claim 6, wherein to transmit the overlap warning, the processor compiles a list comprising each of the at least two participants.

8. The electronic device of claim 1, further comprising a camera, the camera communicatively coupled to the processor, and wherein the conference call is a video conference call.

9. A method comprising:
detecting, by a processor of an electronic device, a connection to a conference call comprising a plurality of call participants;
rendering a conference call dashboard on a display of the electronic device, the conference call dashboard including a participant region for each participant of the plurality of call participants;
detecting overlapping audio originating from at least two call participants; and
in response to detecting the overlapping audio, presenting, on the display, a text transcription of a respective audio of each of the at least two participants identified.

10. The method of claim 9, further comprising visually highlighting participant regions corresponding to the at least two call participants associated with the overlapping audio.

11. The method of claim 9, wherein presenting the text transcription comprises:
determining whether an audio transcript display option is activated for the conference call; and
in response to determining that an audio transcript display option for the conference call is not activated:
transcribing the detected audio from each of the at least two call participants into a corresponding text transcription; and
displaying the transcribed text associated with each of the at least two call participants in one of (i) a corresponding participant region on the conference call dashboard and (ii) a participant list, with the transcribed text associated with a corresponding participant identification (ID) of the at least two call participants.

12. The method of claim 11, further comprising, in response to determining that an audio transcript display option for the conference call is activated, visually highlighting participant regions corresponding to just the at least two call participants associated with the overlapping audio.

13. The method of claim 9, wherein detecting overlapping audio comprises:

determining an arrival time of audio data from each call participant;

computing an overlap duration for audio data for each call participant; and indicating an actionable overlap incident in response to computing an overlap duration that exceeds a predetermined threshold duration.

14. The method of claim 9, further comprising transmitting an overlap warning to at least two call participants.

15. The method of claim 14, further comprising compiling a list comprising each of the at least two participants.

16. The method of claim 9, wherein the conference call is a video conference call.

17. A computer program product comprising a non-transitory computer readable medium having program instructions that when executed by a processor of an electronic device, configure the electronic device to perform functions comprising:

detecting, by the processor, a connection to a conference call comprising a plurality of call participants;

rendering a conference call dashboard on a display of the electronic device, the conference call dashboard including a participant region for each participant of the plurality of call participants;

detecting overlapping audio originating from at least two call participants; and in response to detecting the overlapping audio, presenting, on the display, a text transcription of a respective audio of each of the at least two participants identified.

18. The computer program product of claim 17, wherein the computer program product further comprises program instructions for:

determining whether an audio transcript display option is activated for the conference call; and in response to determining that an audio transcript display option for the conference call is not activated:

transcribing the detected audio from each of the at least two call participants into a corresponding text transcription; and displaying the transcribed text associated with each of the at least two call participants in one of (i) a corresponding participant region on the conference call dashboard and (ii) a participant list, with the transcribed text associated with a corresponding participant identification (ID) of the at least two call participants.

19. The computer program product of claim 18, wherein the computer program product further comprises program instructions for:

in response to determining that an audio transcript display option for the conference call is activated, visually highlighting participant regions corresponding to just the at least two call participants associated with the overlapping audio.

20. The computer program product of claim 17, wherein the computer program product further comprises program instructions for detecting overlapping audio which include:

determining an arrival time of audio data from each call participant;

computing an overlap duration for audio data for each call participant; and indicating an actionable overlap incident in response to computing an overlap duration that exceeds a predetermined threshold duration.

\* \* \* \* \*